(12) United States Patent
Sun

(10) Patent No.: US 7,977,912 B2
(45) Date of Patent: Jul. 12, 2011

(54) ELECTRONIC APPARATUS AND BATTERY UNIT

(75) Inventor: Na Sun, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/604,159

(22) Filed: Oct. 22, 2009

(65) Prior Publication Data

US 2010/0156341 A1 Jun. 24, 2010

(30) Foreign Application Priority Data

Dec. 24, 2008 (JP) ................................. 2008-328071

(51) Int. Cl.
*H02J 7/00* (2006.01)

(52) U.S. Cl. .................................. 320/103; 361/679.55

(58) Field of Classification Search .................. 320/103; 429/98, 158

See application file for complete search history.

(56) References Cited

U.S. PATENT DOCUMENTS

| 6,002,583 | A  | * | 12/1999 | Shoji et al. ............... | 361/679.55 |
| 6,709,784 | B2 | * | 3/2004  | Resch et al. .................. | 429/123    |
| 6,768,637 | B1 | * | 7/2004  | Amemiya ................ | 361/679.55 |
| 6,821,670 | B2 | * | 11/2004 | Hsueh .............................. | 429/98     |
| 6,894,893 | B2 | * | 5/2005  | Hidesawa ................ | 361/679.55 |
| 7,433,182 | B2 | * | 10/2008 | Fan ........................... | 361/679.55 |

FOREIGN PATENT DOCUMENTS

| JP | 10-222259   | 8/1998  |
| JP | 11-296264   | 10/1999 |
| JP | 2001-23589  | 1/2001  |
| JP | 2002-134080 | 5/2002  |
| JP | 2004-112909 | 4/2004  |
| JP | 2005-158565 | 6/2005  |

* cited by examiner

*Primary Examiner* — Edward Tso
*Assistant Examiner* — Ramy Ramadan
(74) *Attorney, Agent, or Firm* — Blakely, Sokoloff, Taylor & Zafman LLP

(57) ABSTRACT

According to one embodiment, an electronic apparatus includes a main body and a battery unit which supplies power to the main body. The battery unit includes a first battery having a first connecting portion connected to the main body and a second connecting portion provided independent of the first connecting portion, and a second battery connected to the first battery via the second connecting portion. The second connecting portion is configured to be connected to the second battery in two different directions.

4 Claims, 6 Drawing Sheets

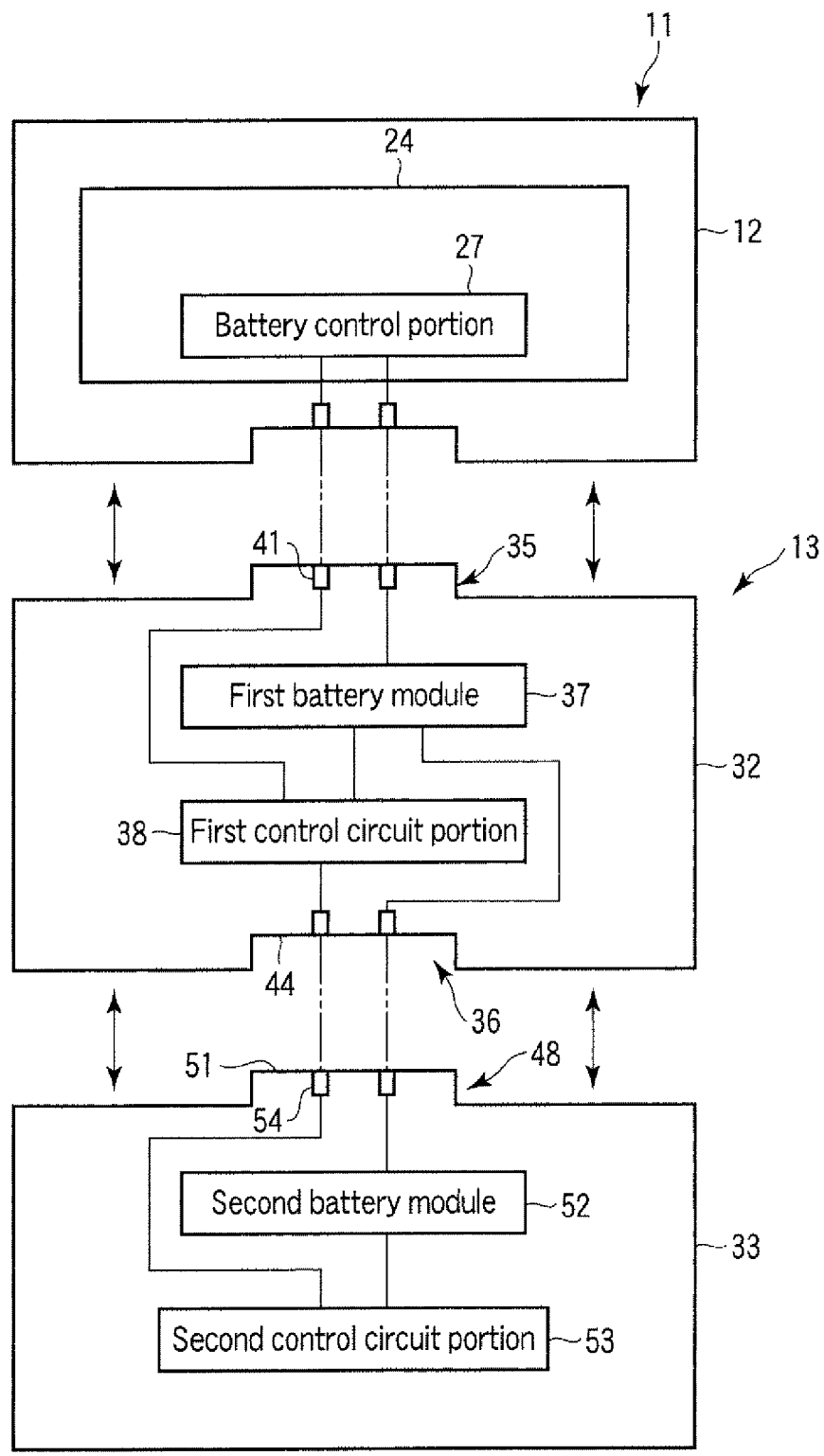
F I G. 3

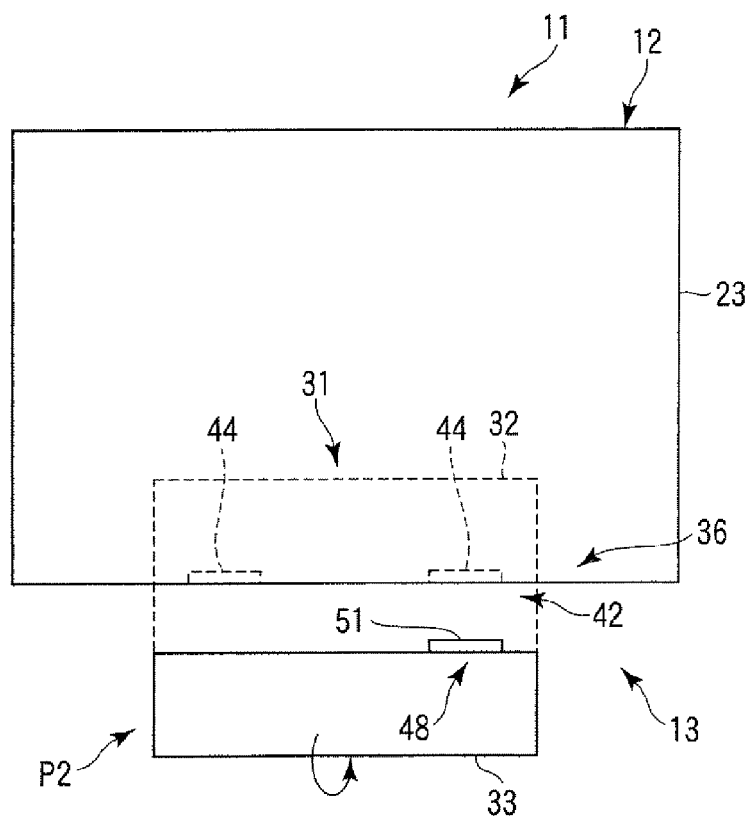
F I G. 6
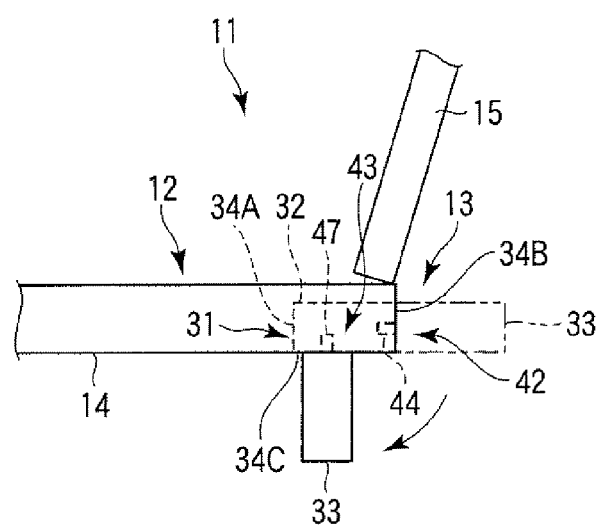
F I G. 7

ELECTRONIC APPARATUS AND BATTERY UNIT

CROSS-REFERENCE TO RELATED APPLICATIONS

This application is based upon and claims the benefit of priority from Japanese Patent Application No. 2008-328071, filed Dec. 24, 2008, the entire contents of which are incorporated herein by reference.

BACKGROUND

1. Field

One embodiment of the present invention relates to an electronic apparatus having an add-on battery and also to a battery unit.

2. Description of the Related Art

Jpn. Pat. Appln. KOKAI Publication No. 2001-23589 discloses a large-capacity battery pack including a box-shaped first battery pack, which is normally used, and a box-shaped second battery pack, which is used in add-on time. The first battery pack has one connector on one surface. The second battery pack has one connector on a first surface and one connector on a second surface opposite to the first surface.

When the battery pack is normally used, the first battery pack is connected to an electronic apparatus. The user, who wishes to use a large-capacity battery, interposes the second battery pack between the electronic apparatus and the first battery pack. With this configuration, the electronic apparatus, the second battery pack and the first battery pack are connected in line in this order, thereby increasing the capacity of the battery.

When the add-on second battery pack is provided, in the case where the second battery pack is arranged in line with respect to the first battery pack for normal use, the battery pack as a whole becomes long. In this case, it may be inconvenient for the user to use the battery pack, depending on the situation of use.

SUMMARY

According to one embodiment, the electronic apparatus comprises a main body and a battery unit which supplies power to the main body. The battery unit may comprise a first battery having a first connecting portion connected to the main body and a second connecting portion provided independent of the first connecting portion and a second battery connected to the first battery via the second connecting portion. The second connecting portion may be configured to be connected to the second battery in at least two different directions. In one embodiment, the second connecting portion includes a first connector unit and a second connector unit connected to the second battery in a different direction from the first connector unit. The first connector unit includes two first connectors which, according to one embodiment, may be arranged symmetrically with respect to a first point on the first battery. The second battery is configured to connect to the first connector unit regardless whether the main surface or the back surface of the second battery is directed upward.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary block diagram showing a control configuration of a main body and a battery unit of the portable computer shown in FIG. 1;

FIG. 6 is a top view of the portable computer shown in FIG. 5, in which the battery unit is upside-down;

FIG. 7 is an exemplary side view of the portable computer shown in FIG. 4, in which a second battery removed from a first connector unit is connected to a second connector unit;

DETAILED DESCRIPTION

Various embodiments according to the invention will be described hereinafter with reference to the accompanying drawings. In general, according to one embodiment of the invention, an electronic apparatus includes a main body and a battery unit which supplies power to the main body. The battery unit includes a first battery having a first connecting portion connected to the main body and a second connecting portion provided independent of the first connecting portion, and a second battery connected to the first battery via the second connecting portion. The second connecting portion is configured to be connected to the second battery in two different directions.

A first embodiment of an electronic apparatus of the present invention will be described below with reference to FIGS. 1 to 7. In the following description of this embodiment, the invention is applied to a portable computer, a so-called notebook personal computer, as an example of the electronic apparatus.

Figure 1:
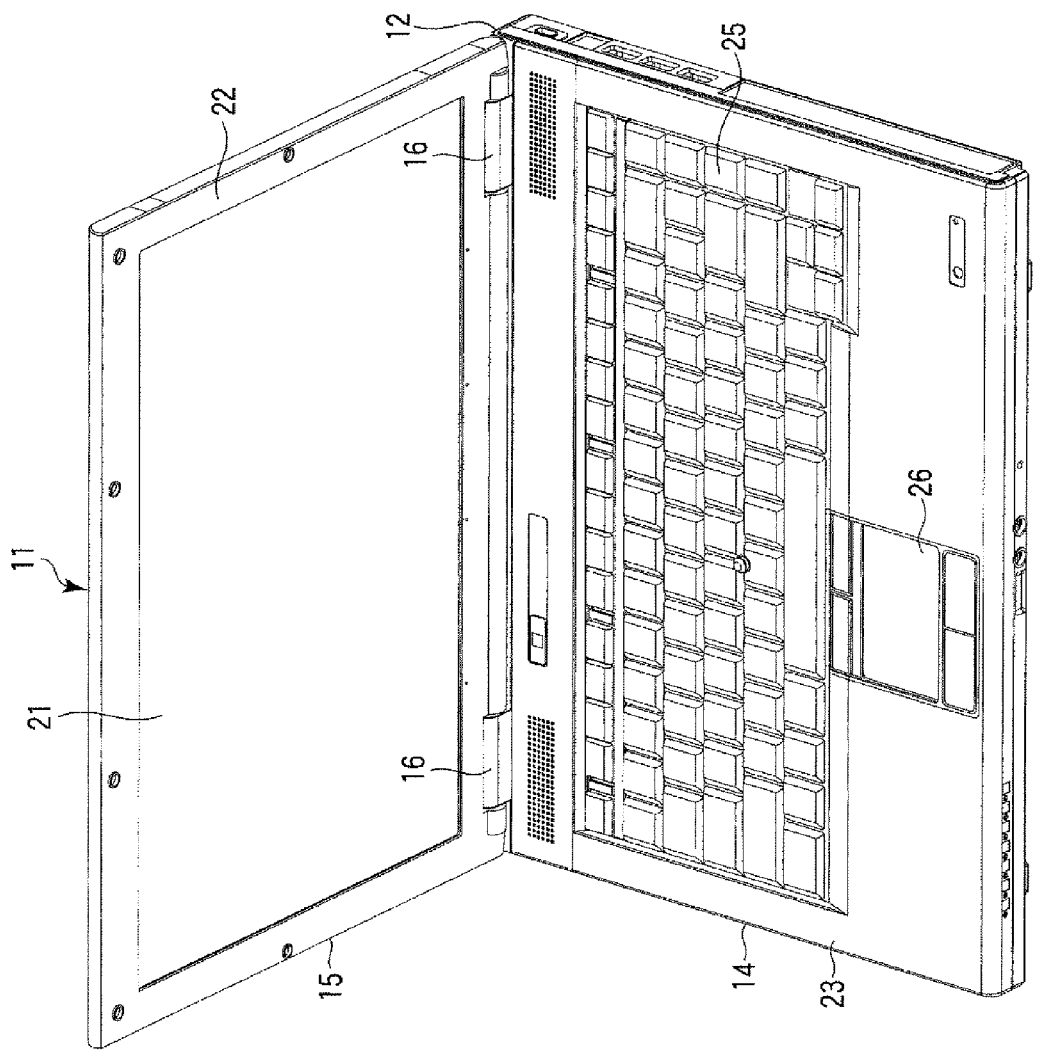
FIG. 1 is an exemplary perspective view showing a portable computer as an example of an electronic apparatus according to a first embodiment of the present invention.
Figure 2:
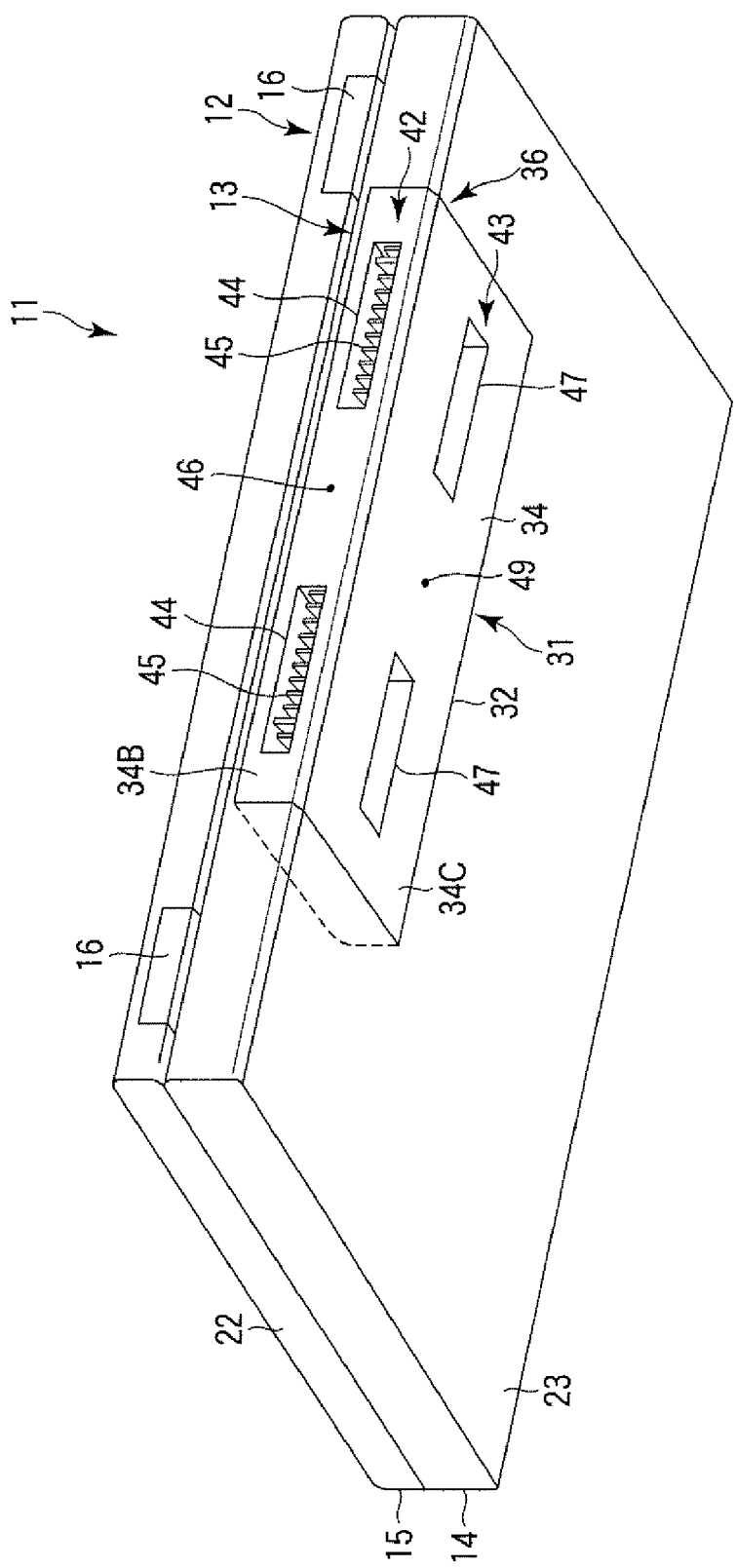
FIG. 2 is an exemplary perspective view showing a bottom portion of the portable computer shown in FIG. 1.

As shown in FIGS. 1 to 3, a portable computer 11 has a main body 12, and a battery unit 13 which supplies power to the main body 12. The main body 12 includes a main body portion 14, a display portion 15 and a hinge portion 16 provided between the main body portion 14 and the display portion 15. The hinge portion 16 rotatably supports the display portion 15. The hinge portion 16 supports the display portion 15 to be rotatable between a closed state, in which the display portion 15 is closed relative to the main body portion 14, and an open state, in which the display portion 15 is open relative to the main body portion 14.

The display portion 15 comprises a liquid crystal display 21 as an example of the display, and a cover 22 made of synthetic resin which surrounds the liquid crystal display 21.

The main body portion 14 comprises a housing 23 made of synthetic resin, a printed circuit board 24 contained inside the housing 23, a keyboard 25 and a touch pad 26 mounted on the housing 23. The printed circuit board 24 is a main board equipped with a plurality of circuit parts, such as a CPU. As shown in FIG. 3, a battery control portion 27 is mounted on the printed circuit board 24. An attachment portion 31, which is shaped as a rectangular recess, is provided in a bottom portion on the back side of the housing 23. A first battery 32 of the battery unit 13 is removably attached to the attachment portion 31.

Figure 4:
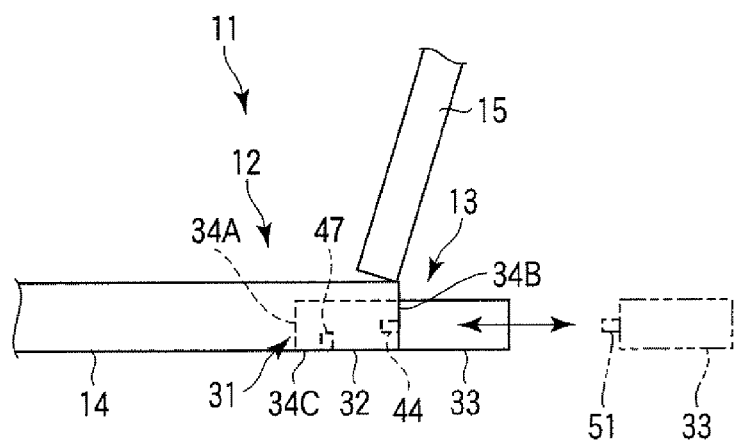
FIG. 4 is an exemplary side view of the main body and the battery unit of the portable computer shown in FIG. 1.

As shown in FIGS. 3 and 4, the battery unit 13 has a first battery 32 as standard equipment of the main body 12 at the time of purchase, and an add-on second battery 33 to be connected to the first battery 32. The second battery 33 is provided for the user as an option, which is to be purchased after the portable computer 11 is purchased.

The first battery 32 has a thick rectangular battery pack 34, a first connecting portion 35 which is provided on a first surface 34A of the battery pack 34 and faces the main body 12, and a second connecting portion 36 which is provided on another surface of the battery pack 34 and independent of the first connecting portion 35. The first battery 32 is connected to the main body 12 via the first connecting portion 35. The second battery 33 is connected to the second connecting portion 36.

The first battery 32 further has a first battery module 37 comprising a plurality of batteries, and a first control circuit portion 38 to control the first battery module 37. The first control circuit portion 38 detects the amount of power remaining in the first battery module 37. The first control circuit portion 38 is connected to a first control terminal 41 of the connector provided in the first connecting portion 35, so that it can detect the state of connection between the main body 12 and the first battery 32.

As shown in FIGS. 2 to 4, the second connecting portion 36 includes a first connector unit 42 provided on, for example, a second surface 34B opposite to the first surface 34A of the battery pack 34, and a second connector unit 43 provided on a third surface 34C perpendicular to the first surface 34A and the second surface 34B. Thus, the second connecting portion 36 has the two connector units, the connecting directions of which are different from each other. Therefore, the first battery 32 can be connected to the second battery 33 in two or more different directions. In this embodiment, the third surface 34C coincides with a bottom surface of the portable computer 11.

As shown in FIG. 2, the first connector unit 42 has, for example, two first connectors 44, each having a plurality of terminals 45. The two first connectors 44 are arranged symmetrically with respect to a first point 46 on the second surface 34B. The plurality of terminals 45 of one of the first connectors 44 are arranged in the order opposite to that of the terminals 45 of the other first connector 44.

The second connector unit 43 has substantially the same configuration as the first connector unit 42. For example, it has two second connectors 47. Each of the second connectors 47, as well as the first connectors 44, has a plurality of terminals which are not shown. The plurality of terminals of one of the second connectors 47 are arranged in the order opposite to that of the terminals of the other second connector 47. The two second connectors 47 are arranged symmetrically with respect to a second point 49 on the third surface 34C.

Figure 5:
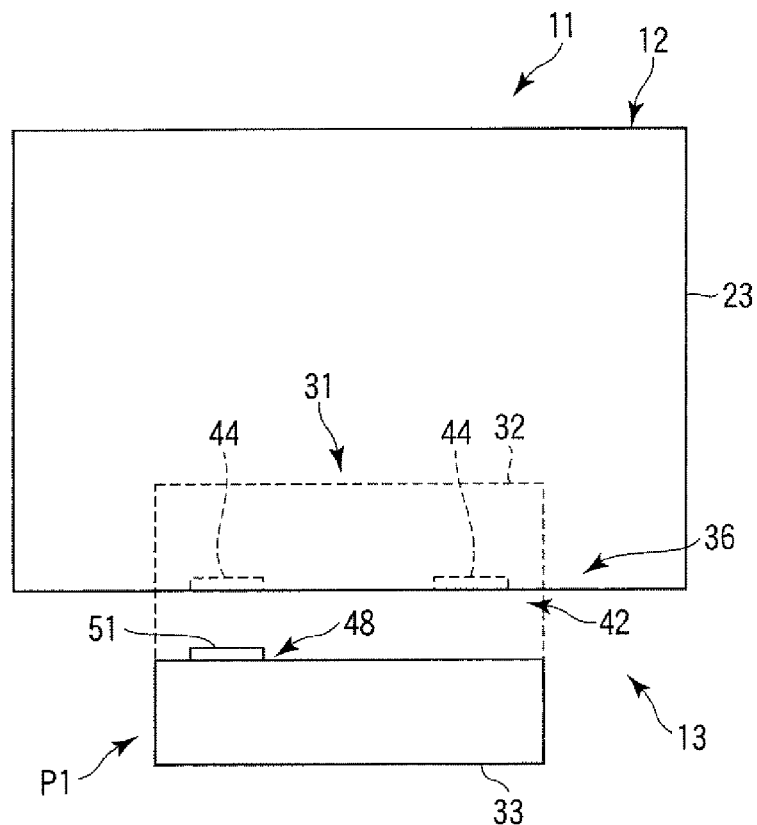
FIG. 5 is an exemplary top view of the main body and the battery unit of the portable computer shown in FIG. 4.

As shown in FIGS. 4 and 5, the second battery 33 is substantially the same in size as the first battery 32, and shaped as a thick rectangular plate. As shown in FIG. 4, the second battery 33 can be attached to or detached from the first battery 32. The second battery 33 has a third connector 51 in a third connecting portion 48, which is to be connected to the second connecting portion 36 of the first battery 32. The third connector 51 is arranged in a position nearer to an end portion in the width direction of the second battery 33 and deviated from the central portion in the width direction. The third connector 51 can be attached to or detached from both the first connector 44 and the second connector 47.

As shown in FIG. 3, the second battery 33 further has a second battery module 52 comprising a plurality of batteries and a second control circuit portion 53 to control the second battery module 52. The second control circuit portion 53 detects the amount of power remaining in the second battery module 52. The second control circuit portion 53 is connected to a second control terminal 54 provided in the third connector 51, so that it can detect the state of connection between the first battery 32 and the second battery 33.

Charge control of the portable computer 11 and the battery unit 13 will now be described with reference to FIG. 3. First, in the state where the first battery 32 is connected to the main body 12 and the second battery 33 is connected to the first battery 32, the first control circuit portion 38 transmits to the battery control portion 27 the amount of power remaining in the first battery 32 and information that the main body 12 is connected to the first battery 32. The second control circuit portion 53 transmits to the battery control portion 27 the amount of power remaining in the second battery 33 and information that the first battery 32 is connected to the second battery 33. In this connection state, if the main body 12 is connected to, for example, an external plug socket through an AC adapter, the battery control portion 27 charges the first and second batteries 32 and 33 while detecting the amounts of power remaining therein. Alternatively, if an AC adapter is not used in this connection state, the first control circuit portion 38 detects the power remaining in the first battery 32. When the remaining power is less than a predetermined value, for example, 50%, the first control circuit portion 38 causes the second battery 33 to supply power to the first battery 32 to charge the first battery 32.

A function of the battery unit 13 of the portable computer 11 of this embodiment will now be described with reference to FIGS. 5 to 7. As shown in FIG. 5, the second battery 33 is attachable to and detachable from the first connector unit 42 of the first battery 32. When the second battery 33 is to be attached to the first battery 32, if the user holds the second battery 33 in a first position P1 where the third connector 51 is situated in a left side with the main surface directed up, the third connector 51 is connected to the first connector 44 on the left side of the first connector unit 42. On the other hand, as shown in FIG. 6, if the user holds the second battery 33 in a second position P2 where the third connector 51 is situated in a right side with the back surface directed up, the third connector 51 is connected to the first connector 44 on the right side of the first connector unit 42. Thus, regardless of whether the main or back surface of the second battery 33 is directed up, in this embodiment, the second battery 33 can be connected to the first battery 32. Therefore, the user is not troubled about the direction of the second battery 33. The second connector 47 of the second connector unit 43 can also receive the second battery 33 regardless of whether the main or back surface of the second battery 33 is directed up.

Further, as shown in FIG. 7, the second battery 33 can be removed from the first connector 44 of the first connector unit 42 and connected to either one of the second connectors 47 of the second connector unit 43 located below. Therefore, the second battery 33 is prevented from protruding in the depth direction, so that the convenience can be improved, for example, when the user is using the portable computer 11 in a small space, for example, in a train. Thus, the attachment position of the second battery 33 can be changed flexibly depending on the situation of use. Likewise, the second battery 33, which has been connected to the second connector 47, can be removed therefrom and reconnected to the first connector 44.

According to the first embodiment, the portable computer 11 comprises the main body 12 and the battery unit 13 which supplies power to the main body 12. The battery unit 13 comprises: the first battery 32 having the first connecting portion 35 connected to the main body 12 and the second connecting portion 36 independent of the first connecting portion 35; and the second battery 33 connected to the first battery 32 via the second connecting portion 36. The second connecting portion 36 can be connected to the second battery 33 in two or more different connecting directions. With this configuration, when the user is using the portable computer 11 in a small space, for example, in a train or a coffee shop, the connecting direction of the second battery 33 can be changed, so that the limited space can be effectively utilized. Accordingly, the attachment position of the second battery 33 can be changed suitably and the portable computer 11 can be used flexibly in accordance with the situation of use.

In this embodiment, the second connecting portion 36 includes the first connector unit 42 and the second connector unit 43, which is connected in a different direction from the first connector unit 42. With this configuration, the simple structure using the first connector unit 42 and the second connector unit 43 constitutes the battery unit 13 having two or more connecting portions connected in different directions can be obtained.

The first connector unit 42 includes the two first connectors 44, which are arranged symmetrically with respect to the first point 46 on the first battery 32. Similarly, the second connector unit 43 includes the two second connectors 47, which are arranged symmetrically with respect to the second point 49 on the first battery 32.

With the configuration described above, regardless of whether the main or back surface of the second battery 33 is directed up, the second battery 33 can be connected to the first connector unit 42 and the second connector unit 43 of the first battery 32. Therefore, the user is not troubled about which direction the second battery 33 is directed.

The first battery 32 further has the control circuit portion which detects the amount of power remaining therein. When the amount of power remaining in the first battery 32 is less than a predetermined value, the control circuit portion causes the second battery 33 to supply power to the first battery 32. With this configuration, power is assured in the first battery 32 with a higher priority. Therefore, even when the second battery 33 need be removed, power is assured in the first battery 32 with a higher priority. Therefore, the possibility that the main body 12 and the first battery 32 are power-exhausted is reduced to a minimum.

Figure 8:
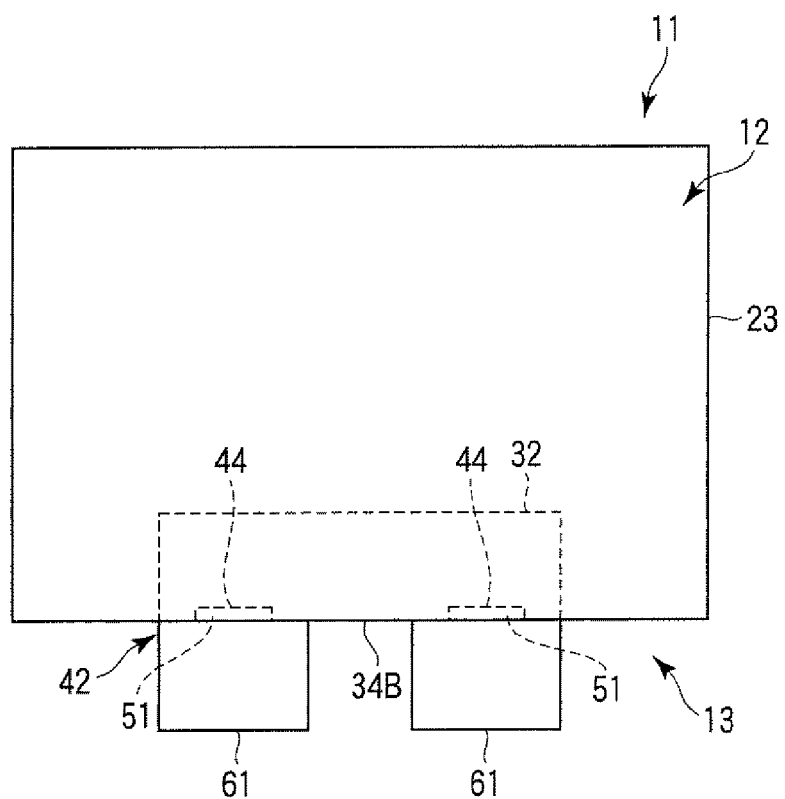
FIG. 8 is an exemplary top view showing a portable computer as an example of an electronic apparatus according to a second embodiment of the present invention.

A second embodiment of the portable computer 11 will now be described with reference to FIG. 8. The portable computer 11 as an example of the electronic apparatus according to the second embodiment is different from that of the first embodiment in the configuration of the second battery 33, but the same in the other parts. Therefore, different parts will mainly be described below, while the same parts are identified by the same reference numerals and descriptions thereof will be omitted.

A second battery 61 of the second embodiment is smaller than the second battery of the first embodiment. The second battery 61 is versatile. For example, it can also be used for another portable computer. This embodiment is different from the first embodiment in that a plurality of terminals 45 of the two first connectors 44 and those of the two second connectors 47 are all directed in the same direction. The second battery 61 can be attached or detached from either one or both of the first connectors 44 or the second connectors 47.

With the portable computer of the second embodiment, the add-on second battery 61, which has been used for the portable computer formerly used, can also be used for the new portable computer 11. Thus, the still available battery can be reused.

A third embodiment of the portable computer will now be described with reference to FIG. 9. The portable computer 11 as an example of the electronic apparatus according to the third embodiment is different from that of the first embodiment in the position of a second connector unit 72 of the first battery 32, but the same in the other parts. Therefore, different parts will mainly be described below, while the same parts are identified by the same reference numerals and descriptions thereof will be omitted.

The first battery 32 has a thick rectangular battery pack 34, a first connecting portion 35 which is provided on a first surface 34A of the battery pack 34 and faces the main body 12, and a second connecting portion 71 which is provided on another surface of the battery pack 34 and independent of the first connecting portion 35. The first battery 32 is longer in the fore-aft direction than that of the first embodiment, and protrudes backward in the depth direction from the back end of the main body 12. The second connecting portion 71 includes a first connector unit 42 provided on a second surface 34B opposite to the first surface 34A of the battery pack 34, and a second connector unit 72 provided on a fourth surface 34D perpendicular to the first surface 34A and the second surface 34B. In this embodiment, the fourth surface 34D coincides with a top surface of the portable computer 11.

The first connector unit 42 has, for example, two first connectors 44. The second connector unit 72 has, for example, two second connectors 47. The second battery 33 can be connected to either of the first connectors 44 or the second connectors 47.

Figure 9:
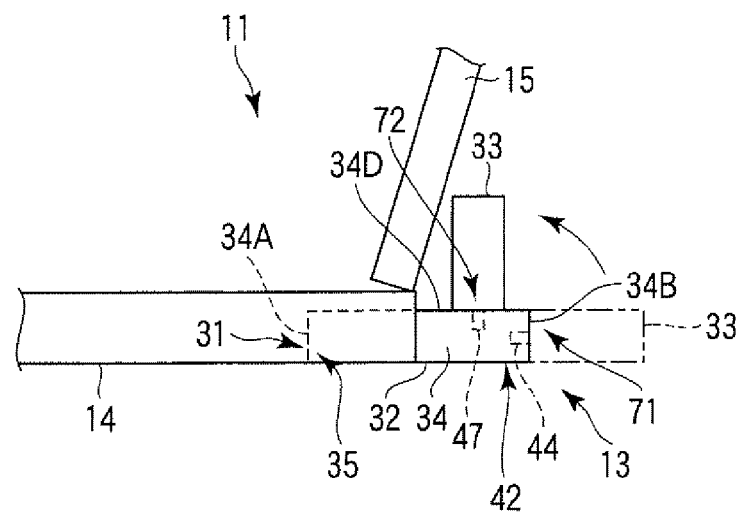
FIG. 9 is an exemplary side view showing a portable computer as an example of an electronic apparatus according to a third embodiment of the present invention.

As shown in FIG. 9, the second battery 33 of the portable computer 11 of this embodiment can be removed from the first connector 44 and connected to the second connector 47 located on the upper surface. If the second battery 33 is connected to the second connector 47, the second battery 33 will not protrude in the depth direction. Thus, the convenience can be improved, when the user is using the portable computer 11 in a small space, for example, in a train. Consequently, with the portable computer 11 of this embodiment, the attachment position of the second battery 33 can be changed flexibly depending on the situation of use.

The electronic apparatus of the present invention is not limited to the above embodiments. In the embodiments described above, the first battery 32 has the two connector units 42 and 43, so that the second battery 33 can be connected to the first battery in two or more directions. However, the invention is not limited to this system. The first battery 32 may be provided with a connector unit and a hinge portion, so that the connector unit can be rotatably supported by the hinge portion. In this case also, the first battery 32 can be connected to the second battery 33 in the two (or more) different directions. Further, the second battery 33 may be provided with a hinge portion, so that the second battery 33 in itself may change the direction of connection. The electronic apparatus of the present invention is not limited to the portable computer but may be a cellular phone. Besides, the electronic apparatus of the present invention may be modified variously without departing from the spirit or scope of the invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
a main body; and
a battery unit which supplies power to the main body,
wherein the battery unit comprises
a first battery having a first connecting portion connected to the main body and a second connecting portion provided independent of the first connecting portion, and
a second battery connected to the first battery via the second connecting portion, the second battery including a main surface and a back surface, the main surface and the back surface being opposite surfaces,
the second connecting portion being configured to be connected to the second battery in at least two different directions,
the second connecting portion includes a first connector unit and a second connector unit connected to the second battery in a different direction from the first connector unit,
the first connector unit includes two first connectors, the two first connectors including a left connector and a right connector are arranged symmetrically with respect to a first point on the first battery, each of the two first connectors including a plurality of terminals, wherein an order of the plurality of terminals of the left connector starting from a left side of the left connector is arranged to be opposite from an order of the plurality of terminals of the right connector starting from a left side of the right connector, and
the second battery is configured to connect to the first connector unit regardless whether the main surface or the back surface of the second battery is directed upward.

2. An electronic apparatus comprising:
a main body; and
a battery unit which supplies power to the main body,
wherein the battery unit comprises
a first battery having a first connecting portion connected to the main body and a second connecting portion provided independent of the first connecting portion, and
a second battery connected to the first battery via the second connecting portion, the second battery including a main surface and a back surface, the main surface and the back surface being opposite surfaces,
the second connecting portion being configured to be connected to the second battery in at least two different directions,
the second connecting portion includes a first connector unit and a second connector unit connected to the second battery in a different direction from the first connector unit,
the second connector unit includes two second connectors, the two second connectors including a left connector and a right connector are arranged symmetrically with respect to a second point on the first battery, each of the two second connectors including a plurality of terminals, wherein an order of the plurality of terminals of the left connector starting from a left side of the left connector is arranged to be opposite from an order of the plurality of terminals of the right connector starting from a left side of the right connector, and
the second battery is configured to connect to the second connector unit regardless whether the main surface or the back surface of the second battery is directed upward.

3. A battery unit comprising:
a first battery having a first connecting portion to be connected to a main body and a second connecting portion provided independent of the first connecting portion; and
a second battery connected to the first battery via the second connecting portion, the second battery including a main surface and a back surface, the main surface and the back surface being opposite surfaces,
wherein the second connecting portion is configured to be connected to the second battery in at least two different directions,
the second connecting portion includes a first connector unit and a second connector unit connected to the second battery in a different direction from the first connector unit,
the first connector unit includes two first connectors, the two first connectors including a left connector and a right connector are arranged symmetrically with respect to a first point on the first battery, each of the two first connectors including a plurality of terminals, wherein an order of the plurality of terminals of the left connector starting from a left side of the left connector is arranged to be opposite from an order of the plurality of terminals of the right connector starting from a left side of the right connector, and
the second battery is configured to connect to the first connector unit regardless whether the main surface or the back surface of the second battery is directed upward.

4. A battery unit comprising:
a first battery having a first connecting portion to be connected to a main body and a second connecting portion provided independent of the first connecting portion; and
a second battery connected to the first battery via the second connecting portion, the second battery including a main surface and a back surface, the main surface and the back surface being opposite surfaces,
wherein the second connecting portion is configured to be connected to the second battery in at least two different directions,
the second connecting portion includes a first connector unit and a second connector unit connected to the second battery in a different direction from the first connector unit,
the second connector unit includes two second connectors, the two second connectors including a left connector and a right connector are arranged symmetrically with respect to a second point on the first battery, each of the two second connectors including a plurality of terminals, wherein an order of the plurality of terminals of the left connector starting from a left side of the left connector is arranged to be opposite from an order of the plurality of terminals of the right connector starting from a left side of the right connector, and
the second battery is configured to connect to the second connector unit regardless whether the main surface or the back surface of the second battery is directed upward.

* * * * *